(12) United States Patent
Duan et al.

(10) Patent No.: US 12,003,332 B2
(45) Date of Patent: *Jun. 4, 2024

(54) SYSTEMS AND METHODS FOR IMPLEMENTING HYBRID AUTOMATIC REPEAT REQUEST RETRANSMISSION SCHEDULING

(71) Applicant: Samsung Electronics Co., Ltd., Suwon-si (KR)

(72) Inventors: Ruchen Duan, Santa Clara, CA (US); Mostafa Sayed Roshdy Ibrahim, San Jose, CA (US); Wook Bong Lee, San Jose, CA (US); Srinivas Kandala, Morgan Hill, CA (US); Ashok Ranganath, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/078,032

(22) Filed: Dec. 8, 2022

(65) Prior Publication Data

US 2023/0107677 A1 Apr. 6, 2023

Related U.S. Application Data

(63) Continuation of application No. 16/935,024, filed on Jul. 21, 2020, now Pat. No. 11,546,093.
(Continued)

(51) Int. Cl.
*H04L 1/18* (2023.01)
*H04L 1/1812* (2023.01)
(Continued)

(52) U.S. Cl.
CPC .......... *H04L 1/1819* (2013.01); *H04L 5/0055* (2013.01); *H04L 5/0092* (2013.01); *H04W 8/24* (2013.01)

(58) Field of Classification Search
CPC ..... H04L 5/0055; H04L 55/0092; H04W 8/24
See application file for complete search history.

(56) References Cited

U.S. PATENT DOCUMENTS

| 8,151,158 B2 * | 4/2012 | Mudulodu ........ H03M 13/6306 714/751 |
| 2005/0220040 A1 | 10/2005 | Petrovic et al. |

(Continued)

FOREIGN PATENT DOCUMENTS

WO 2018185637 A1 10/2018

OTHER PUBLICATIONS

EPO Extended Search Report dated Feb. 9, 2021, issued in corresponding European Patent Application No. 20187836.0 (10 pages).
(Continued)

*Primary Examiner* — Shukri Taha
(74) *Attorney, Agent, or Firm* — Lewis Roca Rothgerber Christie LLP

(57) ABSTRACT

A method of implementing a hybrid automatic repeat request (HARQ) process. The method includes: transmitting, by a transmitter to a receiver, an initial transmission of the HARQ process; receiving, by the transmitter from the receiver, receiver decoding capability information; setting, by the transmitter, a retransmission duration based on the receiver decoding capability information; and implementing, by the transmitter, a retransmission of the HARQ process based on the retransmission duration.

19 Claims, 7 Drawing Sheets

Related U.S. Application Data

(60) Provisional application No. 62/900,288, filed on Sep. 13, 2019.

(51) Int. Cl.
    *H04L 5/00*     (2006.01)
    *H04W 8/24*     (2009.01)

(56) References Cited

U.S. PATENT DOCUMENTS

| | | |
|---|---|---|
| 2007/0110324 A1 | 5/2007 | Kwon et al. |
| 2008/0043619 A1 | 2/2008 | Sammour et al. |
| 2010/0192035 A1 | 7/2010 | Sagfors et al. |
| 2012/0026963 A1 | 2/2012 | Kim et al. |
| 2013/0308464 A1 | 11/2013 | Park et al. |
| 2015/0043473 A1 | 2/2015 | Kim et al. |
| 2015/0381400 A1 | 12/2015 | Park et al. |
| 2016/0261724 A1 | 9/2016 | Lee et al. |
| 2017/0026976 A1* | 1/2017 | Yoo ................. H04L 1/0009 |
| 2017/0170932 A1 | 6/2017 | Chu et al. |
| 2019/0288708 A1* | 9/2019 | Ma ................. H03M 13/118 |
| 2019/0356430 A1 | 11/2019 | Cheng et al. |
| 2020/0007275 A1 | 1/2020 | Sarkis et al. |
| 2021/0036809 A1 | 2/2021 | Shellhammer et al. |

OTHER PUBLICATIONS

Chinese Office Action for CN Application No. 202010945951.1 dated Dec. 19, 2023, 10 pages.

* cited by examiner

SYSTEMS AND METHODS FOR IMPLEMENTING HYBRID AUTOMATIC REPEAT REQUEST RETRANSMISSION SCHEDULING

CROSS-REFERENCE TO RELATED APPLICATIONS

This application is a continuation of U.S. patent application Ser. No. 16/935,024, filed on Jul. 21, 2020, which is based on and, under 35 U.S.C. § 119(e), claims priority to U.S. Provisional Patent Application No. 62/900,288, filed on Sep. 13, 2019 in the United States Patent and Trademark Office, the entire disclosures of each of which are incorporated by reference herein.

FIELD

The present disclosure is generally related to wireless communication systems. In particular, the present disclosure is related to systems and methods for implementing hybrid automatic repeat request (HARQ) retransmission (ReTx) scheduling.

BACKGROUND

HARQ is a retransmission scheme that can include one or more of transmission by a transmitter to a receiver, feedback from the receiver to the transmitter, retransmission by the transmitter to the receiver, or combining of received signals (e.g., from an initial transmission and a retransmission) by the receiver.

SUMMARY

According to some embodiments, a method of implementing a HARQ process. The method includes: transmitting, by a transmitter to a receiver, an initial transmission of the HARQ process; receiving, by the transmitter from the receiver, receiver decoding capability information; setting, by the transmitter, a retransmission duration based on the receiver decoding capability information; and implementing, by the transmitter, a retransmission of the HARQ process based on the retransmission duration.

According to some embodiments, a method of implementing a HARQ process includes receiving, by a receiver from a transmitter, an initial transmission of the HARQ process; transmitting, by the receiver to the transmitter, receiver decoding capability information; receiving, by the receiver from the transmitter, a retransmission; and implementing, by the receiver, a decoding and feedback process for the retransmission.

According to some embodiments, a method of implementing a HARQ process includes receiving, by a transmitter from a receiver, receiver decoding capability information; receiving, by the transmitter from the receiver, feedback regarding a transmission of the HARQ process; and determining, by the transmitter, to implement a retransmission based on the feedback. The method further includes determining, by the transmitter, a decoding time based on the receiver decoding capability information and based on a size of the retransmission; determining, by the transmitter based on the decoding time, to implement a remediation process; and implementing, by the transmitter, the remediation process.

BRIEF DESCRIPTION OF THE DRAWINGS

Aspects, features, and advantages of certain embodiments of the present disclosure will be readily apparent from the following detailed description and the accompanying drawings.

DETAILED DESCRIPTION

Certain embodiments described herein involve a HARQ communication scheme. HARQ retransmission and the combining of received signals can provide for an increased probability that a receiver can decode a received packet, which can improve accuracy and/or throughput. Certain communication systems, such as Wi-Fi systems, could benefit from implementing such a HARQ communication scheme. However, there are challenges to implementing accurate, fast (e.g., high throughput), or efficient HARQ communication schemes in such communication systems. Certain embodiments described herein provide for improved HARQ communication schemes, and may involve one or more improved retransmission mechanisms or scheduling, feedback schemes, error code schemes, remediation processes, and/or improved control signaling.

Figure 1:
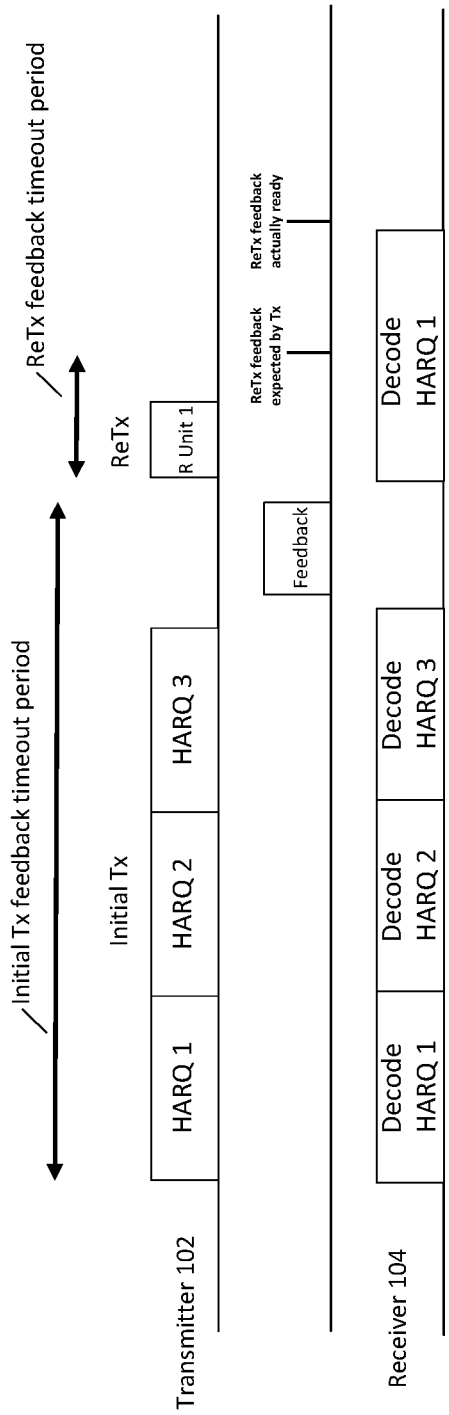
FIG. 1 shows a diagram of a HARQ process including a retransmission, according to some embodiments.

FIG. 1 shows a diagram of an example HARQ process that includes a retransmission. The depicted HARQ system 100 includes a transmitter 102 and a receiver 104 performing a HARQ process. The transmitter 102 may include one or more encoders configured to encode HARQ transmissions, and the receiver 104 may include one or more decoders configured to decode HARQ transmissions. For convenience, plural encoders or decoders (e.g., encoders or decoders configured to process data in parallel) may be referred to herein simply as an encoder or a decoder (singular). The example HARQ process depicted in FIG. 1 involves an initial HARQ transmission (Tx), decoding, feedback, a retransmission (ReTx), and retransmission feedback.

As shown in FIG. 1, the transmitter 102 is configured to transmit, to the receiver 104, a HARQ transmission comprising one or more physical layer ("PHY") data units (e.g., a physical layer convergence procedure (PLCP) protocol data unit (PPDU) that includes one or more HARQ units (physical layer units used in the HARQ process)) that include one or more media access control (MAC) layer data units (e.g., MAC protocol data units (MPDUs) or MAC service data units (MSDUs)). In the depicted example, the initial HARQ transmission includes three HARQ units: HARQ 1, HARQ 2, and HARQ 3. In other embodiments, a different number of HARQ units can be included in the HARQ transmission (e.g., one, two, four, or more HARQ units).

The HARQ transmission that includes the three HARQ units is an "initial" transmission of the HARQ process (e.g., in that it is a first transmission of the HARQ process, possibly aside from certain initiation communications, certain handshake protocol communications, certain connection establishing communications, or certain control information communications). The HARQ transmission may be the first transmission in the HARQ process that includes a data payload (e.g., a payload including one or more MPDUs encoded in one or more HARQ units).

The receiver 104 may be configured to receive one or more HARQ transmissions and/or retransmissions from the transmitter 102, to decode the one or more HARQ transmissions and/or retransmissions, and to transmit feedback information to the transmitter 102. In some embodiments, the receiver 104 is configured to decode HARQ units to extract MPDUs that were encoded in the HARQ units. In some embodiments, the receiver 104 is also or alternatively configured to process MPDUs (e.g., the MPDUs extracted from the HARQ units) to extract or analyze information included in the MPDUs (such as MSDU information). In some embodiments, after decoding the HARQ units, the receiver 104 may be configured to extract the MPDUs, remove the MAC header(s) and extract the MSDUs. Responsive to the MSDUs being correctly processed, the receiver 104 may pass the MSDUs from the MAC layer to an upper layer.

The initial HARQ transmission may include control information (e.g., in a header (such as, for example, in a preamble of the header)), or control information for the HARQ transmission may be sent out-of-band or independently from the initial HARQ transmission, and the receiver 104 may make use of such control information when decoding HARQ units or processing MPDUs included in the HARQ transmission.

The receiver 104 is configured to determine feedback information (which may be referred to herein as "feedback") and to transmit the feedback to the transmitter 102. The feedback may include acknowledgement (ACK) or non-acknowledgement (NACK) information. The receiver 104 may determine the feedback. For example, the receiver 104 may determine whether an error is detected for at least some portion of the HARQ transmission, such that the at least some portion of the HARQ transmission is not correctly decoded or is not able to be (or is unlikely to be) correctly decoded. The feedback may be used to cause the transmitter 102 to send a retransmission that may include, for example, the data that was not correctly decoded, or may include other information (e.g., parity bits or other error management code, a different encoding of the initially transmitted data, or other data), and using this retransmission, the receiver 104 may be able to decode the portion of the HARQ transmission that was not initially correctly decoded. Certain example techniques for using the retransmission to decode the portion of the HARQ transmission that was not initially correctly decoded are described in detail below, including chase combining techniques and incremental redundancy techniques.

ACK information (which may be referred to herein as "ACK") may indicate an acknowledgement that at least some of the information included in the HARQ transmission was correctly decoded and processed by the receiver 104. The terms "correctly decoded" or "correctly processed," as used herein, can mean completely decoded or processed without errors, or decoded or processed with an acceptable number of errors or an acceptable number of potential errors (such an acceptable number being, for example, predetermined (e.g., defined in a communication standard)), or can mean able to be (or sufficiently likely to be) decoded (e.g., based on a determination performed by a receiver before decoding or processing is complete) without errors or decoded or processed with an acceptable number of errors, or an acceptable likelihood of a number of errors being below a threshold, or an acceptable number of potential errors. "Potential errors" may be determined based on a determined likelihood of one or more errors.

The feedback may also, or alternatively, include NACK information (which may be referred to herein as "NACK"), which can indicate that at least some information included in the HARQ transmission was not correctly decoded by the receiver 104. In some embodiments, when the receiver 104 determines to send the NACK for at least a portion of the HARQ transmission, the receiver 104 does not send an ACK for other portions of the HARQ transmission that were correctly decoded, and the transmitter 102 is configured to interpret receipt of such a NACK as an indication that the portion of the HARQ transmission that the NACK pertains to was not correctly decoded, and, in some embodiments, also as an implicit indication that the other portion(s) of the HARQ transmission (the portion(s) of the HARQ transmission that the NACK does not pertain to) was correctly decoded. In some embodiments, the receiver 104 may omit transmission of an ACK, and this omission may be interpreted by the transmitter 102 as a NACK (e.g., responsive to the transmitter 102 not receiving feedback from the receiver 104 within a time period designated for reception of feedback).

The transmitter 102 is configured to receive the feedback, and to determine whether to send a retransmission to the receiver 104. As used herein, the term "retransmission" can refer to a transmission subsequent to the initial transmission, or to a transmission responsive to feedback received from the receiver 104. In some embodiments, the retransmission has a start time later than a start time of the initial transmission. In some embodiments, the retransmission may partially temporally overlap with the initial transmission. Although the retransmission shown in FIG. 1 includes a single HARQ unit ("R unit 1"), in some embodiments, more than one HARQ unit may be included in the retransmission.

The retransmission can include at least some of the same or similar data included in the initial transmission, or information related to the data included in the initial transmission (e.g., parity bits or other error management code corresponding to the data included in the original transmission, or a different encoding of the initially transmitted data). This data may include one or more HARQ units included in the initial transmission, or one or more MPDUs included in the initial transmission. The one or more HARQ units or MPDUs included in the initial transmission may or may not be encoded differently than corresponding HARQ units or MPDUs in the retransmission.

The transmitter 102 may use the retransmission at least in part to resend data that the feedback indicates was incorrectly decoded by the receiver 104, or to send data related to data that was incorrectly decoded by the receiver 104 (e.g., error code corresponding to the data that was incorrectly decoded by the receiver 104). For example, if the transmitter 102 receives a NACK indicating that a particular data unit was not correctly decoded, the transmitter 102 may responsively determine to send a retransmission that includes the particular data unit, or error code corresponding to the particular data unit.

If the feedback indicates that all content of the HARQ transmission has been correctly decoded and processed (e.g., if the feedback includes an ACK indicating that all content of the HARQ transmission has been correctly decoded and processed), the transmitter 102 may responsively determine to omit a retransmission. In some embodiments, the receiver 104 sends current frame end (CF end) feedback, indicating that decoding and processing is complete, and responsive to receipt of the CF end feedback the transmitter 102 may determine to omit a retransmission.

The receiver 104 may receive the retransmission, and may attempt to decode or process the data that was not initially correctly decoded or processed (e.g., that was not correctly decoded or processed on the basis of the initial transmission). In some embodiments, the receiver 104 may store data from the initial transmission that was not correctly decoded or processed, and may use that data in combination with the data included in the retransmission to correctly decode or process the relevant data. For example, the receiver 104 may implement a chase combining technique. For chase combining, a retransmission may include the same data and/or parity bits as included in the initial transmission. The receiver 104 can use, for example, maximum-ratio combining to combine the received bits with the corresponding bits from the initial transmission. As another example, the receiver 104 may implement an incremental redundancy technique. For incremental redundancy, the retransmission includes different information than the initial transmission. Multiple sets of parity bits may be generated, each based on the same set of information bits. The retransmission uses a different set of parity bits than the initial transmission, with a different redundancy version generated by the transmitter 102 by puncturing an encoder output. Thus, with the retransmission, the receiver gains extra information that can be used in conjunction with information received via the initial transmission.

Although a single retransmission is implemented in the embodiment shown in FIG. 1, multiple retransmissions may be implemented as part of the HARQ process. For example, the receiver 104 may transmit feedback to the transmitter 102 responsive to one or more retransmissions (such feedback may be referred to here as "ReTx feedback"), and the transmitter 102 may perform a retransmission responsive to the feedback (e.g., responsive to a ReTx NACK). When the transmitter 102 receives, from the receiver 104, an ACK that indicates (possibly in combination with previously received feedback) that all data, or a sufficient amount of data, included in the initial transmission has been correctly decoded or processed by the receiver 104, the HARQ process may be concluded.

FIG. 1 shows certain scheduling challenges that may be encountered during the retransmission feedback process of the HARQ process 100. Referring first, for context, to the initial transmission feedback process, which in the depicted example does not have any scheduling challenges, the transmitter 102 may expect to receive feedback for the initial transmission within a certain (e.g., predetermined) timeout period after starting to send the initial transmission. The timeout period may have a start point that coincides with a start point of the initial transmitting. The timeout period may be based on a length of the initial transmission (e.g., the timeout period may be determined by the transmitter 102 to have a length equal to a length of the initial transmission plus some additional time). Note that the term "length" as used herein may sometimes (but not necessarily always) be used interchangeably with the term "duration," and it will be clear from the context when this is the case. The timeout period may end shortly after an end point of the initial transmission (e.g., the additional time may be equal to, or approximately equal to, one short interframe space (SIFS), or may be equal to some minimum timeframe permitted by the relevant communication scheme). The receiver 104 may begin processing the initial transmission as it is received (e.g., the receiver 104 may begin processing the HARQ 1 once it is received and before the HARQ 2 and the HARQ 3 are fully received), which can help the receiver 104 provide initial transmission feedback in a timely manner. In the example depicted in FIG. 1, the receiver 104 is able to process the initial transmission and send feedback before an end of the initial transmission feedback timeout period.

However, in the example depicted in FIG. 1, the receiver does not provide retransmission feedback in a timely manner. The transmitter 102 may expect to receive feedback for the retransmission within a certain (e.g., predetermined) retransmission timeout period after starting to send the retransmission. The timeout period may have a start point that coincides with a start point of the retransmission. The timeout period may be based on a length of the retransmission (e.g., the timeout period may be determined by the transmitter 102 to have a length equal to a length of the retransmission plus some additional time). The retransmission feedback timeout period may end shortly after an end point of the retransmission (e.g., the additional time may be equal to, or approximately equal to, one short interframe space (SIFS)).

The retransmission may have a shorter length than the initial transmission of the corresponding data unit (e.g., the depicted retransmission of HARQ 1 may be shorter than the initial transmission of HARQ 1), for example, because less than the entire data unit may be sent, or because error code (rather than the data unit itself) may be sent as at least part of the retransmission. The length of the ReTx feedback timeout period, which is based on the length of the retransmission, may correspondingly be shorter than the length of the initial transmission feedback timeout period. Thus, the receiver 104 may have less time to provide feedback to the transmitter 102.

Furthermore, the receiver 104's processing of the retransmission may take longer than the processing of the corresponding portion of the initial transmission because, for example, the receiver 104 may implement a combining technique that makes use of both the initial transmission data and retransmission data.

Thus, for the retransmission, the receiver 104 may have less time to provide feedback to the transmitter 102 than for the initial transmission, and/or the receiver 104 may use more time to process the retransmission than to process the initial transmission. One or more of these factors may lead to the scheduling challenges depicted in FIG. 1, and as shown in FIG. 1, the retransmission feedback timeout period ends before the receiver 104 is ready to provide feedback for the retransmission. This can be problematic, for example, because the transmitter 102 may determine that no ACK has been received by the end of the retransmission feedback timeout period, and may interpret this as a NACK, possibly triggering the transmitter to incorrectly determine that the transmission has failed and/or triggering an unnecessary additional retransmission to correct a perceived error.

Figure 2:
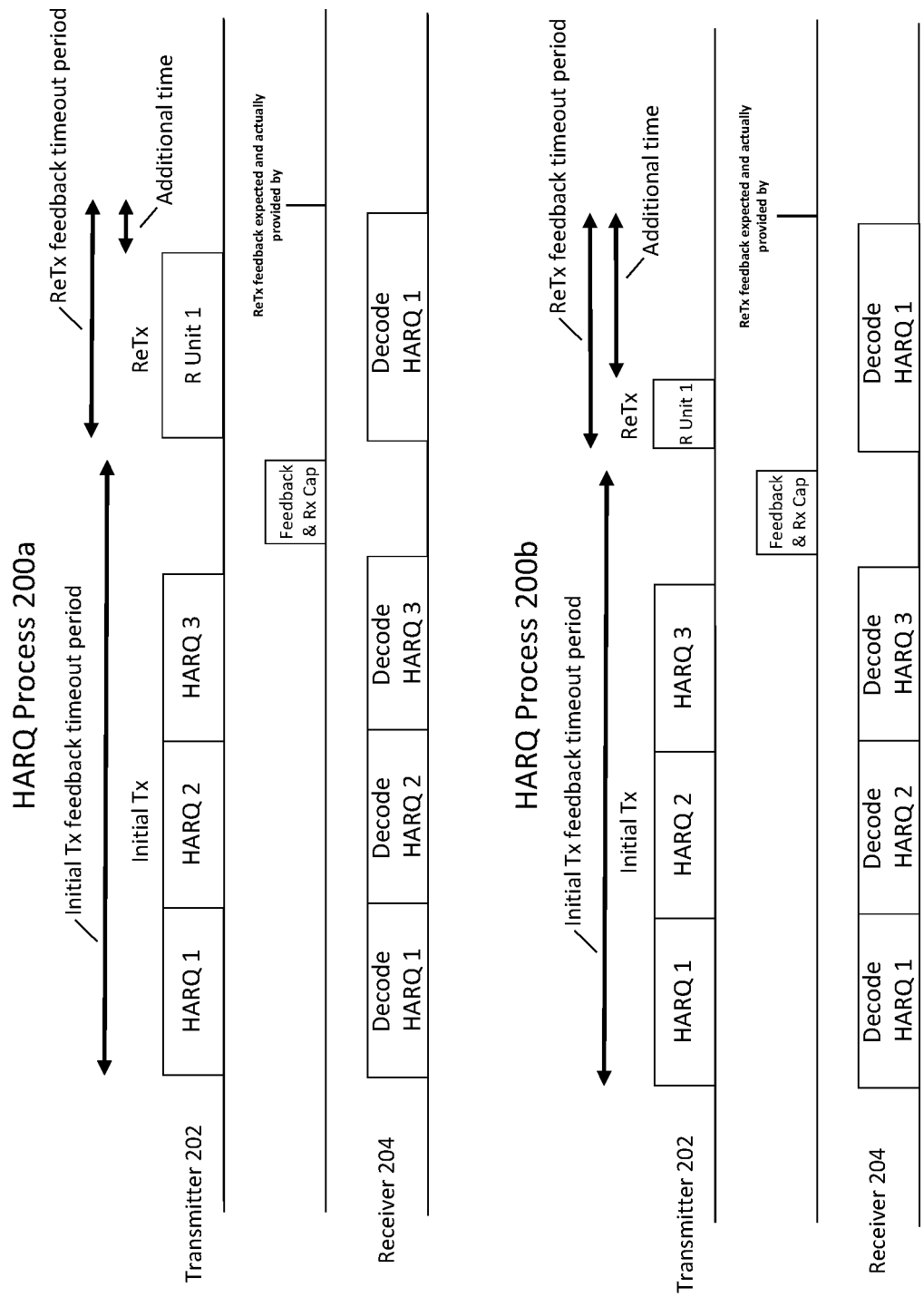
FIG. 2 shows a diagram of improved HARQ processes that each include a retransmission, according to some embodiments.

FIG. 2 shows improved HARQ processes 200a and 200b. The HARQ processes 200a and 200b are implemented using a transmitter 202 (which may be similar to the transmitter 102 described above) and a receiver 204 (which may be similar to the receiver 104 described above). In the depicted HARQ process 200a and the HARQ process 200b, following receipt of the initial transmission, the receiver 204 sends both feedback and receiver decoding capability information ("Rx Cap") to the transmitter 202. The receiver decoding capability information can include information related to the receive 204's decoding capability (e.g., an indication of the receiver's decoding throughput). Although the Rx Cap is provided with the feedback in the depicted examples, as discussed in more detail below, the Rx Cap may be provided to the transmitter in other ways.

In HARQ process 200a, the transmitter 202 may set or adjust a duration of the retransmission based on the Rx Cap of the receiver 204. In the depicted example, the duration of the retransmission is extended relative to the example shown in FIG. 1. Because a duration of the retransmission feedback timeout period is based on a duration of the retransmission (e.g., is equal to the duration of the retransmission plus some additional time), the retransmission feedback timeout period is also extended relative to the example shown in FIG. 1, and the receiver 204 is able to provide retransmission feedback before an end of the retransmission feedback timeout period.

In the HARQ process 200a, the transmitter 202 sets a target duration of a retransmission of an "R unit 1" (a retransmission related to the HARQ 1, which may include error code (e.g., parity bits) related to the HARQ 1 and/or may include data included in the HARQ 1 (the data may possibly be encoded differently than the encoding used for the HARQ 1)) such that the retransmission is longer than the retransmission shown in the comparative example of FIG. 1. The transmitter 202 may use the Rx Cap to calculate or estimate a decoding time (e.g., a likely decoding time, a target decoding time, or a maximum decoding time) used by the receiver 204 to process the retransmission (e.g., to decode the HARQ 1 using the retransmission), and may set a duration of the retransmission such that the retransmission feedback timeout period ends at or later than the calculated or estimated decoding time. Thus the transmitter 202 may be configured to expect feedback regarding the retransmission at a more appropriate time, which can decrease the chance that the transmitter 202 will erroneously determine that the receiver 104 is not sending an ACK when in fact the receiver 204 is simply not yet done processing the retransmission.

In HARQ process 200b, the transmitter 202 sets a duration of the retransmission feedback timeout period equal to the duration of the retransmission plus some additional time, and the transmitter 202 sets or adjusts a duration of the additional time based on the Rx Cap of the receiver 204. The transmitter 202 may use the Rx Cap to calculate or estimate a decoding time (e.g., a likely decoding time, a target decoding time, or a maximum decoding time) used by the receiver 204 to process the retransmission (e.g., to decode the HARQ 1 using the retransmission), and may set a duration of the additional time such that the retransmission feedback timeout period ends at or later than the calculated or estimated decoding time. Thus the transmitter 202 may be configured to expect feedback regarding the retransmission at a more appropriate time, which can decrease the chance that the transmitter 202 will erroneously determine that the receiver 204 is not sending an ACK when in fact the receiver 204 is simply not yet done processing the retransmission.

It is noted that in some embodiments, a retransmission feedback timeout period may begin when the retransmission is complete. In such embodiments, the retransmission feedback timeout period may correspond to, and be equal to, the "additional time" described herein.

It is noted that in some embodiments, one or more features of HARQ process 200a may be combined with one or more features of HARQ process 200b, as appropriate. In some embodiments, an adjusted transmission duration (or setting of an appropriate transmission duration) may be combined with a process such as adjusting (or setting an appropriate) additional time. In some embodiments, a remediation process (e.g., as described herein) may be implemented in combination with any of the above techniques, as appropriate.

Figure 3:
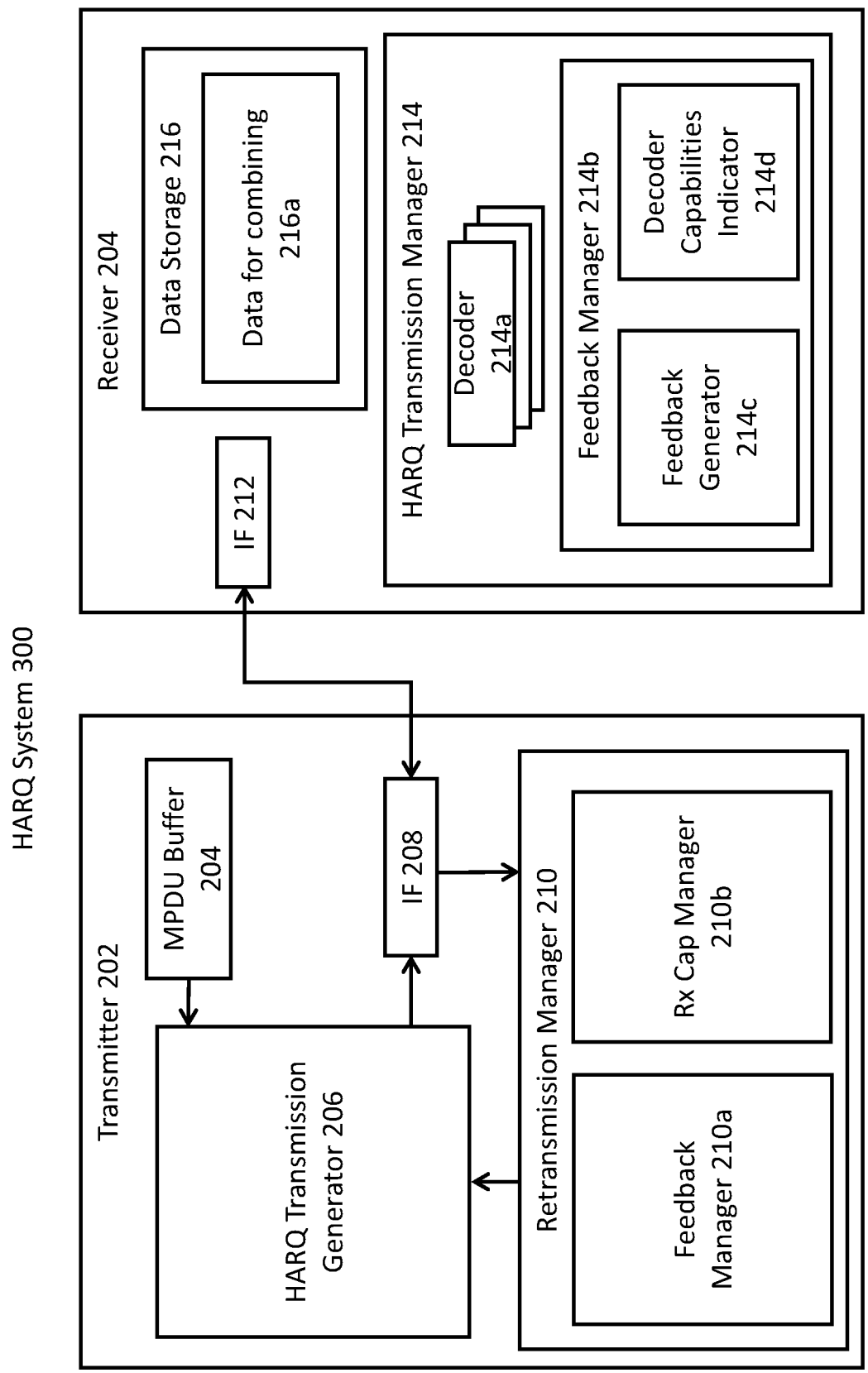
FIG. 3 shows a diagram of a HARQ system including a transmitter and a receiver, according to some embodiments.

Referring now to FIG. 3, FIG. 3 shows a diagram of an improved HARQ system 300 including the transmitter 202 and the receiver 204, according to some embodiments. The transmitter 202 and the receiver 204 may be communication devices (e.g., any of a network device (e.g., a Wi-Fi modem or other networking device), or a client device (such as a laptop, mobile device, tablet, Internet of things (IoT) connected device, or other device)).

The components shown in FIG. 3 may be implemented as hardware, software, or a combination thereof. The components shown in FIG. 3 may be implemented using one or more of the components shown in FIG. 7. The transmitter 202 may include a processor and memory storing processor-executable instructions for performing one or more processes described herein. (e.g., as described below with respect to FIG. 7). The receiver 204 may include a processor and memory storing processor-executable instructions for performing one or more processes described herein (e.g., as described below with respect to FIG. 7). It is noted that although various components of the transmitter 202 and the receiver 204 are described herein, by way of example, as being configured to perform certain functions, those functions may be performed by other components of the transmitter 202 and the receiver 204, as appropriate.

The transmitter 202 includes an MPDU buffer 204, a HARQ transmission generator 206, an interface (IF) 208, and a retransmission manager 210. In some embodiments, the HARQ transmission generator 206 retrieves MPDUs stored in the MPDU buffer 204, encodes the MPDUs into one or more HARQ units, and generates a HARQ transmission. The IF 208 sends the HARQ transmission to the receiver 204. In some embodiments, the IF 210 receives feedback and/or Rx Cap information from the receiver 204 and sends the feedback and/or Rx Cap information to the retransmission manager 210. The retransmission manager may use the feedback and/or Rx Cap information to configure a retransmission in an improved manner as described herein (e.g., using at least part of the HARQ process 200a and/or at least a part of the HARQ process 200b).

The MPDU buffer 204 is configured to store MPDUs and/or MSDUs. The MPDUs may be MPDUs that are queued or temporarily stored by the transmitter 202 for transmission to the receiver 204. The MPDUs may include MSDUs received from a logical link control (LLC) sublayer, and may include MAC header information. The MPDUs may have been encoded by the transmitter 202, or may have been received by the transmitter 202 in encoded form from another device.

The HARQ transmission generator 206 is configured to generate HARQ transmissions using the MPDUs stored in the MPDU buffer 204. The HARQ transmission generator 206 may include an encoder configured to encode one or more portions of a HARQ transmission. The HARQ transmission may be any transmission of a HARQ process, including any of (but not limited to) an initial transmission, a retransmission, or a connection establishing communication with another communication device (e.g., with the receiver 204).

In some embodiments, the HARQ transmission generator 206 may configure a HARQ retransmission according to certain parameters, which can include, for example, parameters affecting a duration of the retransmission. The parameters can include, for example, a modulation order, a number of data subcarriers $N_{dsubc}$, and/or a number of retransmitted bits $N_{retran}$. The HARQ transmission generator 206 may also or alternatively configure the HARQ retransmission according to certain retransmission feedback timeout period parameters (e.g., a retransmission feedback timeout period duration or end point).

In some embodiments, the HARQ transmission generator 206 may be configured to set values for such parameters for a retransmission of a HARQ process based on information received from the retransmission manager 210. For example, the retransmission manager 210 may indicate to the HARQ transmission generator 206 a decoding time for the retransmission, or a target retransmission duration, and the retransmission manager 210 may configure the retransmission accordingly.

In some embodiments, the HARQ transmission generator 206 may receive from the retransmission manager 210 an indication of Rx Cap information of the receiver 204 (e.g., rather than receiving a decoding time for the retransmission, or a target retransmission duration). In such embodiments, the HARQ transmission generator 206 may itself perform one or more processes to determine the target retransmission duration (e.g., processes described below as being performed by the retransmission manager 210, in certain other embodiments). The HARQ transmission generator 206 may then configure the retransmission accordingly.

In some embodiments, the HARQ transmission generator 206 may receive from the retransmission manager 210 an indication of a decoding time for the retransmission. The decoding time may be a time used by the receiver 204 to decode the retransmission. This decoding time may be based on one or more of the Rx Cap information, a size of the retransmission, or the retransmission scheme (e.g., chase combine or incremental redundancy). In some embodiments, the decoding time may be a minimum time used or needed by the receiver 204 to decode the retransmission (e.g., may be equal to or similar to a data size of the retransmission divided by a throughput (as indicated in the Rx Cap information) of the receiver 204, as determined, for example, by the retransmission manager 210). Based on the decoding time (and possibly based on determined additional time), the HARQ transmission generator 206 may determine a target retransmission duration that provides sufficient time for the receiver 204 to decode the retransmission and provide feedback by an end of the retransmission feedback timeout period. For example, assuming a certain additional time (which may be determined by the HARQ transmission generator 206 in any manner described herein (e.g., may be indicated by the retransmission manager 210, or may be a default or predetermined additional time, such as 1 SIFS)), the HARQ transmission generator 206 may select a target retransmission length such that the target retransmission length in addition to the additional time is equal to, or greater than, the decoding time. In some embodiments, the HARQ transmission generator 206 may select a target retransmission length such that the target retransmission length in addition to the additional time is equal to, or greater than, the decoding time in addition to a time used by the receiver 204 for determining and transmitting the feedback for the retransmission.

le;.4qIn some embodiments, the HARQ transmission generator 206 may receive from the retransmission manager 210 an indication that a certain retransmission duration should be used or targeted (e.g., rather than the retransmission manager 210 providing a decoding time and the HARQ transmission generator 206 itself determining the retransmission duration). The indication may include, for example, a specific retransmission duration, a minimum retransmission duration, a maximum retransmission duration, or a range of retransmission durations (e.g., defined by a maximum and a minimum retransmission duration). The indicated retransmission duration may be a target retransmission duration, and the HARQ transmission generator 206 may set a retransmission duration that is closest to (and possibly at least as large as) the target retransmission duration, out of a set of candidate retransmission durations that are configurable or obtainable given certain parameters the HARQ transmission generator 206 uses to set the retransmission duration.

The HARQ transmission generator 206 may set certain parameters for the retransmission to help achieve the target retransmission duration. Reference herein to setting a retransmission duration may refer to setting parameters that affect the retransmission duration. Any of the above parameters may be controlled or set by the HARQ transmission generator 206 to help achieve the target retransmission duration, as appropriate. Generally speaking, the retransmission duration will increase if $N_{dsubc}$ decreases, and will increase if $N_{retran}$ increases. In some embodiments, the HARQ transmission generator 206 may perform processes to determine an adjustment from a default parameter value or from a parameter value used for corresponding data of the initial transmission, and may set the parameter value for the retransmission accordingly.

In some embodiments, the HARQ transmission generator 206 may set a modulation order for the retransmission based on (e.g., to help achieve) a target retransmission duration. For example, the HARQ transmission generator 206 may set a low modulation order (e.g., lower than was used for the corresponding data of the initial transmission, or lower than a default modulation order for retransmissions) for the retransmission, which corresponds to a long retransmission duration (e.g., longer than the transmission of the corresponding data in the initial transmission). The HARQ transmission generator 206 can determine the modulation order, for example, based on any of the target retransmission duration $T_{Target}$, $N_{dsubc}$, or $N_{retran}$.

By way of example, the following equation, or relationships between parameters defined by the equation, can be used to determine a target number of bits per subcarrier $N_{bps}$ for the retransmission:

$$N_{bps} = \frac{N_{retran} SymbolDuration}{N_{dsubdtarget}} \quad \text{(Equation 1)}$$

The following table shows correlations between the $N_{bps}$ parameter and the modulation order:

TABLE 1

| $N_{bps}$ | Modulation order |
|---|---|
| 1 | Binary phase shift keying (BPSK) |
| 2 | Quadrature phase shift keying (QPSK) |

TABLE 1-continued

| $N_{bps}$ | Modulation order |
|---|---|
| 4 | 16 Quadrature amplitude modulation (QAM) |
| 6 | 64 QAM |
| 8 | 256 QAM |
| 10 | 1024 QAM |
| ... | ... |

The HARQ transmission generator 206 may determine a target $N_{bps}$ based on any of $T_{Target}$, $N_{dsubc}$, or $N_{retran}$ (e.g., using equation 1), and may use the target $N_{bps}$ to set a modulation order for the retransmission accordingly (e.g., using a lookup table storing data that indicates at least some of the correlations of table 1). The HARQ transmission generator 206 may use appropriate values for $N_{dsubc}$ (e.g., an $N_{dsubc}$ available for and/or allocated to the retransmission) and $N_{retran}$ (e.g., an $N_{retran}$ appropriate to the retransmission scheme being used and that accounts for the size of the data that was not correctly processed by the receiver 204).

In some embodiments, the HARQ transmission generator 206 may determine a target $N_{dsubc}$ for the retransmission based on the target retransmission duration (e.g., according to equation 1, using the indicated $T_{Target}$ and using appropriate values for $N_{bps}$ and $N_{retran}$), and the HARQ transmission generator 206 may set $N_{dsubc}$ for the retransmission based on the determined target $N_{dsubc}$ (e.g., may set $N_{dsubc}$ for the retransmission to the determined target $N_{dsubc}$, or may set $N_{dsubc}$ for the retransmission to a closest possible (given one or more other constraints), and possibly at least as small as, $N_{dsubc}$ to the target $N_{dsubc}$). Generally speaking (and as can be seen in equation 1), the retransmission duration increases as $N_{dsubc}$ decreases.

The HARQ transmission generator 206 may implement the target $N_{dsubc}$ by allocating an appropriate resource unit (RU) size and/or an appropriate bandwidth (BW) for the retransmission. Generally speaking, allocating a smaller RU size results in a smaller $N_{dsubc}$, and allocating a narrower bandwidth results in a smaller $N_{dsubc}$.

In some embodiments, the HARQ transmission generator 206 may implement a multiuser (MU) or multiple-input-multiple-output (MIMO) scheme, in which number of data subcarriers may be determined by, at least in part, the bandwidth (BW), or an RU size for orthogonal frequency-division multiple access (OFDMA) or MU cases. The HARQ transmission generator 206 may configure the MU or MIMO scheme (e.g., by allocating the BW or the RU size) such that the $N_{dsubc}$ is set to, or is as close as possible to (e.g., given certain other constraints) the target $N_{dsubc}$. In some embodiments, the HARQ transmission generator 206 may set the number of data subcarriers for the retransmission, at least in part, by appropriately aggregating multiple users in at least one multi-user physical-layer-convergence-procedure protocol data unit (MU-PPDU) and allocating an appropriate resource unit (RU) size for each of the multiple users.

In some embodiments, the HARQ transmission generator 206 may configure a number of special streams (e.g., in a single user case) such that the $N_{dsubc}$ is set to, or is as close as possible to (e.g., given certain other constraints) the target $N_{dsubc}$.

In some embodiments, the HARQ transmission generator 206 may determine a target number of retransmitted bits $N_{retran}$ for the retransmission based on the target retransmission duration (e.g., according to equation 1, using the indicated $T_{Target}$ and using appropriate values for $N_{bps}$ and $N_{dsubc}$), and the HARQ transmission generator 206 may set $N_{retran}$ for the retransmission based on the determined target $N_{retran}$ (e.g., may set $N_{retran}$ for the retransmission to the determined target $N_{retran}$, or may set $N_{retran}$ for the retransmission to a closest possible (given one or more other constraints), and possibly at least as large as, $N_{retran}$ to the target $N_{retran}$). Generally speaking (and as can be seen in equation 1), the retransmission duration increases as $N_{retran}$ increases.

In some embodiments, the HARQ transmission generator 206 may set $N_{retran}$ at least in part by setting a certain number of parity bits or information bits, by setting a number of incorrectly decoded data units addressed by the retransmission, or by including padding to the retransmission (e.g., dummy bits or placeholder bits).

Although some embodiments described herein involve the HARQ transmission generator 206 setting only one parameter based on (e.g., to help achieve) the target retransmission duration, in other embodiments, the HARQ transmission generator 206 may set a combination of any parameters discussed herein based on (e.g., to help achieve) the target retransmission duration. For example, the HARQ transmission generator 206 may set $N_{retran}$ for the retransmission and at least one of (i) a modulation order for the retransmission or (ii) $N_{dsubc}$ for the retransmission.

Thus, the HARQ transmission generator 206 may set a retransmission duration that accommodates the Rx Cap (e.g., as shown in FIG. 2 for HARQ process 200a) by setting retransmission parameters, and the transmitter 202 may thus be configured to expect feedback regarding the retransmission at an appropriate time, which can decrease the chance that the transmitter 202 will erroneously determine that the receiver 204 is not sending an ACK when in fact the receiver 204 is simply not yet done processing the retransmission.

Referring now to the IF 208, in some embodiments, the IF 208 is a communication interface configured to transmit data from the transmitter 202 to another device (e.g., to the receiver 204), and to receive data from another device (e.g., from the receiver 204). The IF 208 may be configured for one or more communication protocols, such as (but not limited to) a Wi-Fi protocol or a local area network (LAN) protocol. The IF 208 may be configured to process and transmit data, such as a HARQ transmission received from the HARQ transmission generator 206, to the receiver 204. The IF 208 may be configured to receive data, such as feedback or Rx Cap information, from the receiver 204. The IF 208 may forward the feedback or Rx Cap information to the retransmission manager 210.

The retransmission manager 210 may receive feedback information and Rx Cap information from the IF 208. The retransmission manager 210 may process the feedback information and may instruct the HARQ transmission generator 206 to implement a retransmission. The retransmission manager 210 may process the Rx Cap information to provide to the HARQ transmission generator 206 an indication of any of the Rx Cap information, a decoding time, a target retransmission duration, a retransmission feedback timeout period, an additional time for the retransmission feedback timeout period, or a remediation process. The retransmission manager 210 may include a feedback manager 210a and an Rx Cap manager 210b.

The feedback manager 210a may process feedback from the receiver 204, including feedback regarding a retransmission of the HARQ process. The feedback manager 210a may, in some embodiments, receive from the Rx Cap manager 210b information regarding how feedback should be processed. For example, the feedback manager 210a may receive from the Rx Cap manager 210b an indication of a retransmission feedback timeout period, such as a length of the retransmission feedback timeout period, a start point of the retransmission feedback timeout period (e.g., based on a retransmission duration), and/or an end point of the retransmission feedback timeout period. The Rx Cap manager 210b may, in some embodiments, indicate that the feedback manager 210a should use default values for the retransmission feedback timeout period.

The feedback manager 210a may, in some embodiments, receive from the Rx Cap manager 210b an indication of a remediation process. The indication may, for example, be an indication regarding a delayed feedback scheme, and may specify an additional time for the retransmission feedback timeout period (e.g., and additional time longer than a default additional time or longer than an additional time used in the initial transmission), as shown, for example, in HARQ process 200b. The indication may, for example, be an indication regarding a deferred feedback scheme, and may specify deferred feedback period after which feedback is "pulled" (e.g., after which the transmitter 202 sends a request for the feedback to the receiver 204).

The feedback manager 210a may process feedback regarding the retransmission using the information indicated by the Rx Cap manager 210b regarding the remediation process. For example, if the Rx Cap manager 210b indicates to the feedback manager 210a to implement a delayed feedback scheme with an extended additional time (e.g., a time longer than 1 SIFS) for the retransmission feedback timeout period, the feedback manager 210a may responsively implement the extended additional time. If an ACK is received before the retransmission feedback timeout period expires, the feedback manager 210a may end the HARQ process. If a NACK is received before the retransmission feedback timeout period, the feedback manager 210a may, responsive to the retransmission feedback timeout period ending, instruct the HARQ transmission generator 206 to send another retransmission (e.g., in accordance with a retransmission scheme, such as chase combine or incremental redundancy) or may determine to end the HARQ process (e.g., if a time permitted for the HARQ process is insufficient to complete another retransmission, or if a maximum number of retransmission has already been implemented). If no ACK is received before the end of the retransmission feedback timeout period, the feedback manager 210a may, responsive to the retransmission feedback timeout period ending, instruct the HARQ transmission generator 206 to send another retransmission or to end the HARQ process (e.g., the feedback manager 210a may treat the lack of an ACK as a NACK).

The feedback manager 210a may, in some embodiments, receive from the Rx Cap manager 210b an indication that a deferred feedback scheme should be implemented. The indication may include a deferred retransmission feedback timeout period, after which the transmitter 202 may pull the feedback. In some embodiments, the initial transmission and the retransmission of the HARQ process may occur during a first TxOP, and the feedback manager 210a may, responsive to receiving from the Rx Cap manager 210b the indication that a deferred feedback scheme should be implemented, expect to receive the feedback following a pull of the feedback by the transmitter 202, and/or may expect to receive the feedback during a second TxOP different from the first TxOP (note that although the terms "first" and "second" are used here, the first and second TxOPs need not be consecutive, and there may be one or more other TxOPs between the first TxOP and the second TxOP). This can help to provide sufficient time for the receiver 204 to decode the retransmission and provide feedback. The transmitter 202 may thus be configured to expect feedback regarding the retransmission at an appropriate time, which can decrease the chance that the transmitter 202 will erroneously determine that the receiver 204 is not sending an ACK when in fact the receiver 204 is simply not yet done processing the retransmission. The deferred feedback scheme may, in some embodiments, be implemented in combination with any other technique described herein, as appropriate.

Referring now to the Rx Cap manager 210b, in some embodiments, the Rx Cap manager 210b may set a target retransmission duration based on the Rx Cap information. In some embodiments, the Rx Cap manager may determine, based on the Rx Cap information, that a remediation process (e.g., a delayed feedback schedule and/or a deferred feedback scheme) should be implemented. In some embodiments, the Rx Cap manager 210b determines that the remediation process should be implemented responsive to determining, based on the Rx Cap information, that the receiver does not have sufficient decoding capabilities to process the retransmission without implementation of a remediation process.

In some embodiments, the Rx Cap manager 210b sets a target retransmission duration based on the Rx Cap information, and indicates the target retransmission duration to the HARQ transmission generator 206. The Rx Cap information may indicate a decoding throughput of the receiver 204. The Rx Cap manager 210b may determine a decoding time (e.g., a likely decoding time, a target decoding time, or a maximum decoding time) used by the receiver 204 to process the retransmission, and may set a target duration of the retransmission such that a retransmission feedback timeout period, which is based on the retransmission duration, ends at or later than the calculated or estimated decoding time. In making this determination, the Rx Cap manager 210b may make use of an estimated retransmission feedback timeout period (e.g., a default retransmission feedback timeout period or a retransmission feedback timeout period determined in any manner described herein, as appropriate).

In some embodiments, the Rx Cap manager 210b determines that a remediation process should be implemented responsive to determining, based on the Rx Cap information, that the receiver does not have sufficient decoding capabilities to process the retransmission without implementation of a remediation process. The Rx Cap manager 210b may make this determination based on any of a throughput of the receiver 204 included in the Rx Cap information, a size of the retransmission, a retransmission length or end point of the retransmission, a retransmission scheme, and a default or estimated retransmission feedback timeout period. For example, the Rx Cap manager 210b may determine a decoding time based on at least the size of the transmission, the retransmission scheme, and a decoder throughput included in the Rx Cap information, and may determine that the default or estimated retransmission feedback timeout period length is insufficient to encompass an estimated time at which the transmitter 202 should receive feedback (based on the decoding time, and possibly based on time for transmitting the feedback (e.g., propagation time)). In some embodiments, the Rx Cap manager 210b may determine that implementing a maximum possible (given certain constraints or requirements) retransmission length would still result in the default or estimated retransmission feedback timeout period being insufficient to encompass an estimated time at which the receiver 202 expects to receive feedback, and the Rx Cap manager 210b may then responsively determine to implement the remediation process.

Responsive to determining that the receiver does not have sufficient decoding capabilities to process the retransmission without implementation of a remediation process, the Rx Cap manager 210b may, in some embodiments, transmit to the feedback manager 210a an indication of a remediation process. The indication may, for example, be an indication regarding a delayed feedback scheme, and may specify an extended additional time for the retransmission feedback timeout period longer than a default additional time for the retransmission feedback timeout period (e.g., longer than 1 SIFS). The indication may, for example, be an indication regarding a deferred feedback scheme, and may specify a deferred feedback scheme timeout period after which the transmitter 202 pulls feedback from the receiver 204.

In some embodiments, the Rx Cap manager 210b may determine, based on the Rx Cap information, an appropriate additional time for the retransmission feedback timeout period. The Rx Cap manager 210b may set or adjust a length of the additional time for the retransmission feedback timeout period based on an estimated decoding time (e.g., a likely decoding time, a target decoding time, or a maximum decoding time) used by the receiver 204 to process the retransmission, and may set a duration of the additional time for the retransmission feedback timeout period such that the retransmission feedback timeout period ends at or later than the an expected time by which the receiver 204 will provide feedback for the retransmission. The Rx Cap manager 210b may make use of a retransmission duration (this information may be indicated by the HARQ transmission generator 206 to the Rx Cap manager 210b) in determining the appropriate length of the additional time for the retransmission feedback timeout period. For example, the Rx Cap manager 210b may determine that the additional time for the retransmission feedback timeout period should be equal to or larger than an amount by which the decoding time exceeds the retransmission length, or that the additional time for the retransmission feedback timeout period should be equal to or larger than an amount by which (the decoding time plus a time for transmitting feedback (e.g., 1 SIFS)) exceeds the retransmission length. The Rx Cap manager 210b may indicate to the feedback manager 210a the determined additional time for the retransmission feedback timeout period or the retransmission feedback timeout period itself (which is based on the determined additional time for the retransmission feedback timeout period), or any of a length of the retransmission feedback timeout period, a start point of the retransmission feedback timeout period (e.g., based on a retransmission duration), and/or an end point of the retransmission feedback timeout period.

As discussed above, by using the Rx Cap manager 210b to appropriately set the retransmission feedback timeout period based on the Rx Cap (e.g., to a length longer than a default length or to a length longer than the length of the retransmission feedback timeout period corresponding to the initial transmission of the HARQ process), the retransmission manager 210 can help avoid erroneously determine that the receiver 104 is not sending an ACK when in fact the receiver 204 is simply not yet done processing the retransmission.

Referring now to the receiver 204, the receiver 204 may include an IF 212, a HARQ transmission manager 214, and a data storage 216. The HARQ transmission manager 214 may process data received from the transmitter 202 as part of a HARQ process, and may indicate to the transmitter 202 (via the IF 212) Rx Cap information.

In some embodiments, the IF 212 may include a communication interface configured to transmit data from the receiver 204 to another device (e.g., to the transmitter 202), and to receive data from another device (e.g., from the transmitter 202). The IF 212 may be configured for one or more communication protocols, such as (but not limited to) a Wi-Fi protocol or a local area network (LAN) protocol. The IF 212 may be configured to process and receive data, such as a HARQ transmission, from the transmitter 202. The IF 212 may be configured to transmit data, such as feedback for the HARQ process, to the transmitter 202. The IF 212 may receive such feedback from the HARQ transmission manager 214. The IF 212 may forward a received HARQ transmission to the HARQ transmission manager 214.

In some embodiments, the HARQ transmission manager 214 includes a decoder 214a and a feedback manager 214b. The decoder 214a may include one or a plurality of decoders (e.g., that may be configured to decode in parallel), but is referred to herein in the singular for simplicity. The decoder 214a may be configured to decode the physical layer units included in a HARQ transmission to extract MPDUs, and may be configured to process the MPDUs (e.g., to extract MSDUs). The decoder 214a may make use of control information received from the transmitter 202 to decode the HARQ transmission. The decoder 214a may use of error detecting code (e.g., cyclic redundancy check (CRC) code) included in the HARQ transmission being processed to detect errors, or to confirm no errors, in the HARQ transmission.

In some embodiments, the feedback manager 214b determines feedback for the HARQ transmission and indicates to the transmitter 202 Rx Cap information. The feedback manager 214b may include a feedback generator 214c and a decoder capabilities indicator 214d.

In some embodiments, the feedback generator 214c may generate feedback regarding the decoding and processing of the HARQ transmission decoded and processed by the decoder 214a, and may send the feedback to the IF 212 for transmission to the transmitter 202. For example, the decoder 214a may indicate to the feedback generator 214c that one or more data units of the HARQ transmission were correctly decoded or processed, and the feedback generator 214c may responsively generate an ACK indicating this, and may send the ACK to the transmitter 202 via the IF 212.

By way of further example, the decoder 214a may indicate to the feedback generator 214c that a data unit includes a detected error (e.g., detected using CRC code included in the HARQ transmission). The feedback generator 214c may responsively generate NACK feedback indicating this, and may send the NACK to the transmitter 202 via the IF 212.

In some embodiments, the feedback generator 214c may store one or more data units that were not correctly decoded or processed in the data storage 216 and/or related data (e.g., error code corresponding to data that was not correctly decoded or processed, such as parity bits) as data for combining 216a. The data for combining 216a may be used by the HARQ transmission manager 214 in conjunction with one or more data units received in a retransmission of the HARQ process to correctly decode or process a data unit of interest. For example, the HARQ transmission manager 214 may implement a chase combining technique or an incremental redundancy technique that makes use of the data for combining 216a and one or more data units received in the retransmission.

In some embodiments, the feedback generator 214c may receive, via the IF 212, an indication to implement a deferred feedback scheme. The feedback generator 214c may implement a feedback process accordingly (e.g., may wait for a pull request from the transmitter 202 to send the deferred feedback).

In some embodiments, the decoder capabilities indicator 214d may indicate to the transmitter 202 Rx Cap information including, for example, a throughput of the decoder 214a. The Rx Cap information may be stored in data storage 216. In some embodiments, the Rx Cap information may be predetermined (e.g., at a time of initial calibration of the receiver 204, or included in firmware of the receiver 204, or preprogrammed at a time of manufacture of the receiver 204). In some embodiments, the Rx Cap information may be determined (e.g., dynamically) by the decoder capabilities indicator 214d based on calibration, monitoring, or testing of the decoder 214a's decoding capabilities.

The decoder capabilities indicator 214d may indicate the Rx Cap information to the transmitter 202 via the IF 212. The decoder capabilities indicator 214d may indicate the Rx Cap information to the transmitter 202 as part of the feedback regarding a transmission of the HARQ process (e.g., as part of a feedback frame), as part of a capabilities exchange (e.g., a process of the receiver 204 indicating HARQ capability), as part of a control frame for the HARQ process, or as part of a connection establishing procedure (e.g., an association procedure, wherein an association between transmitter 202 and the receiver 204 is established, such as when transmitter 202 tries to create a link with the receiver 204).

In some embodiments, the decoder capabilities indicator 214d may indicate the Rx Cap information to the transmitter 202 as part of a request to adjust a retransmission duration or to implement a remediation process. The feedback manager 214b may determine to send a request to adjust a retransmission duration or to implement a remediation process based on determining that an estimated or default retransmission feedback timeout period is insufficient to encompass an estimated time at which the transmitter 202 should receive feedback (based on the decoding time, and possibly based on time for transmitting the feedback). In some embodiments, the feedback manager 214b may determine that the estimated or default retransmission feedback timeout period is insufficient to encompass the estimated time at which the receiver 202 should receive feedback in any manner described herein (e.g., as described with respect to the Rx Cap manager 210b).

Figure 4:
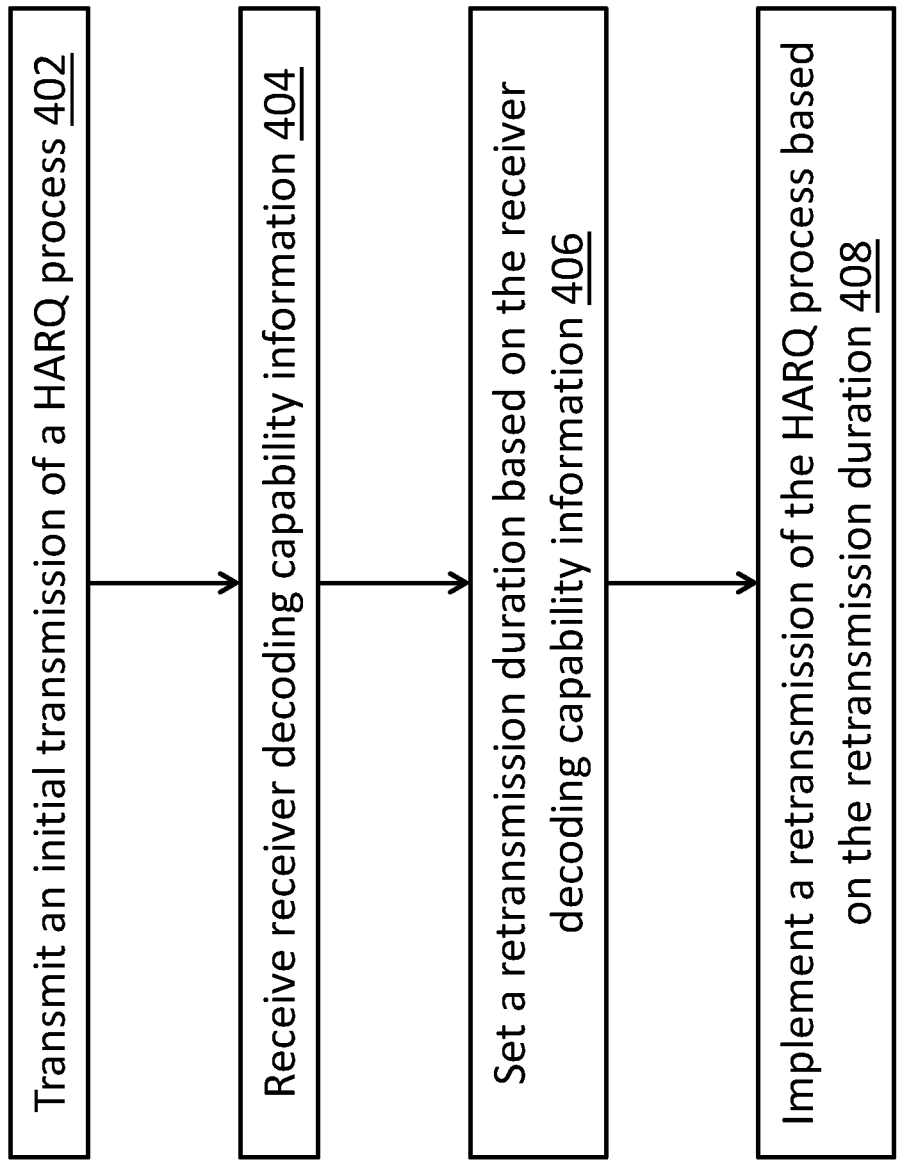
FIG. 4 shows a flowchart of a transmitter HARQ process that includes processing feedback for a HARQ retransmission, according to some embodiments.

Referring now to FIG. 4, FIG. 4 shows a flow of a HARQ process 400. The HARQ process 400 includes transmitting an initial transmission of a HARQ process (402), receiving receiver decoding capability information (404), setting a retransmission duration based on the receiver decoding capability information (406), and implementing a retransmission of the HARQ process based on the retransmission duration (408).

In some embodiments, in operation 402, the transmitter 202 may transmit an initial transmission of a HARQ process 400 to the receiver 204. The initial transmission may include a data payload for the HARQ process 400. The initial transmission may be subsequent to a connection establishing process.

In some embodiments, in operation 404, the transmitter 202 may receive Rx Cap information from the receiver 204. The Rx Cap information may indicate a decoding throughput of the receiver 204. The transmitter 202 may receive the Rx Cap information as part of feedback regarding the initial transmission of the HARQ process 400 (e.g., as part of a feedback frame), as part of a capabilities exchange (e.g., a process of the receiver 204 indicating HARQ capability), as part of a control frame for the HARQ process 400, or as part of a connection establishing procedure (e.g., an association procedure, wherein an association between transmitter 202 and the receiver 204 is established, such as when transmitter 202 tries to create a link with the receiver 204).

In some embodiments, in operation 406, the transmitter 202 may set a retransmission duration based on the receiver decoding capability information, and may indicate the retransmission duration to the HARQ transmission generator 206. For example, the Rx Cap manager 210b may determine a decoding time (e.g., a likely decoding time, a target decoding time, or a maximum decoding time) used by the receiver 204 to process the retransmission based on the Rx Cap information, and may set a target duration of the retransmission such that a retransmission feedback timeout period ends at or later than the calculated or estimated decoding time. In making this determination, the Rx Cap manager 210b may make use of an estimated retransmission feedback timeout period (e.g., a default retransmission feedback timeout period or a retransmission feedback timeout period determined in any manner described herein, as appropriate). The HARQ transmission generator 206 may set the retransmission duration to the indicated retransmission duration by setting one or more retransmission parameters. The parameters can include, for example, a modulation order, a number of data subcarriers $N_{dsubc}$, a number of retransmitted bits $N_{retran}$. These parameters may be set or determined in any appropriate manner described herein (e.g., as described in reference to the HARQ transmission generator 206).

In some embodiments, in operation 408, the transmitter 202 may implement a retransmission of the HARQ process 400 based on the retransmission duration. The retransmission may be implemented used the retransmission parameters set in operation 406.

Thus, the transmitter 202 may configure a retransmission that accommodates the Rx Cap, and the transmitter 202 may thus be configured to expect feedback regarding the retransmission at an appropriate time, which can decrease the chance that the transmitter 202 will erroneously determine that the receiver 204 is not sending an ACK when in fact the receiver 204 is simply not yet done processing the retransmission.

Figure 5:
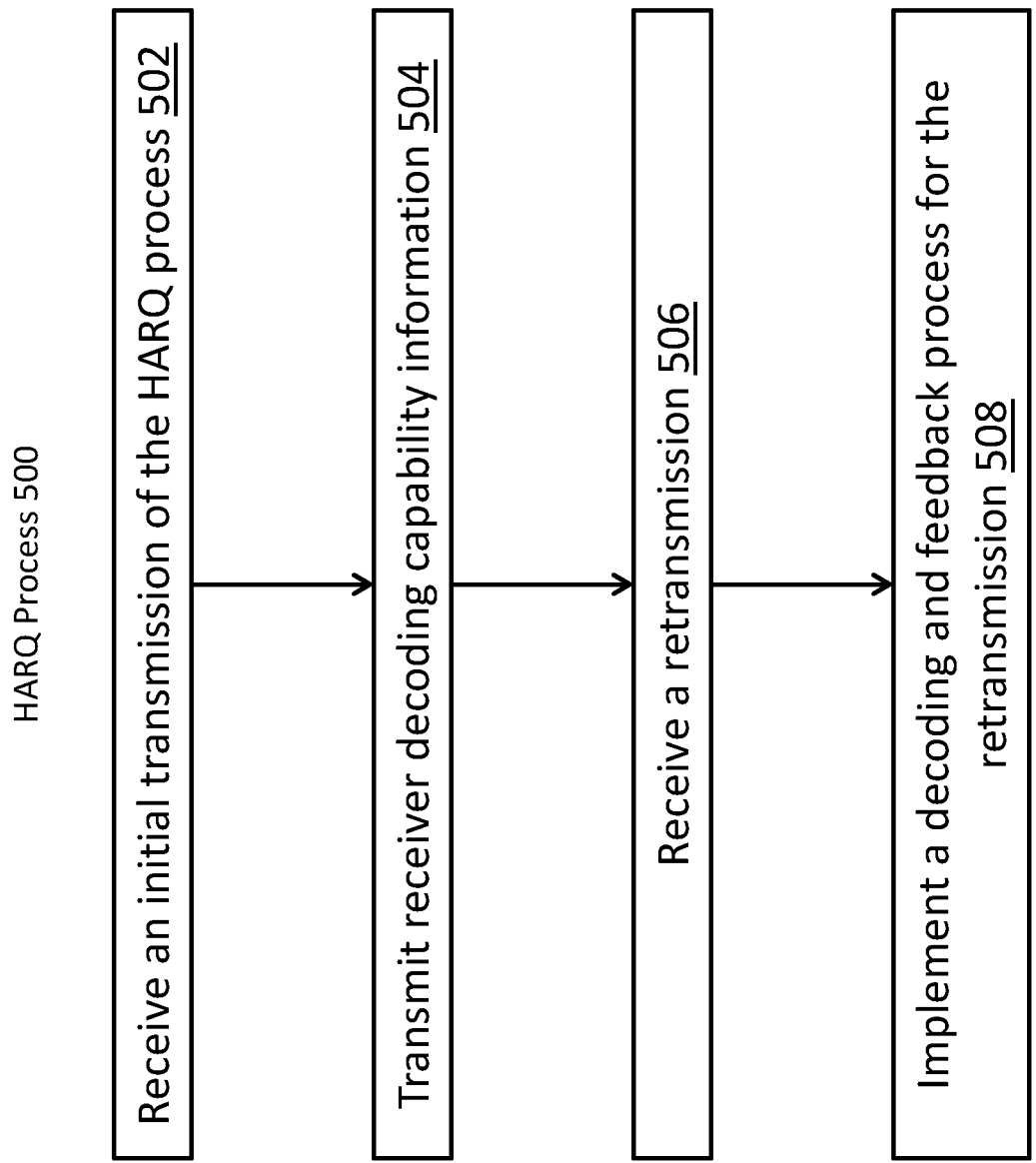
FIG. 5 shows a flowchart of a receiver HARQ process that includes a HARQ retransmission, according to some embodiments.

Referring now to FIG. 5, FIG. 5 shows a flow of a HARQ process 500. The HARQ process 500 includes receiving an initial transmission of the HARQ process 500 (502), transmitting receiver decoding capability information (504), receiving a retransmission (506), and implementing a decoding and feedback process for the retransmission (508).

In some embodiments, in operation 502, the receiver 204 may receive an initial transmission of the HARQ process 500. The initial transmission may include a data payload for the HARQ process 500. The initial transmission may be subsequent to a connection establishing process.

In some embodiments, in operation 504, the receiver 204 may transmit Rx Cap information to the transmitter 202. The Rx Cap information may indicate a decoding throughput of the receiver 204. The Rx Cap information may be stored in data storage 216. In some embodiments, the Rx Cap information may be predetermined (e.g., at a time of initial calibration of the receiver 204, or included in firmware of the receiver 204, or preprogrammed at a time of manufacture of the receiver 204). In some embodiments, the Rx Cap information may be determined by the decoder capabilities indicator 214d based on calibration, monitoring, or testing of the decoder 214a's decoding capabilities.

In some embodiments, in operation 506, the receiver 204 may receive a retransmission duration from the transmitter 202, and in operation 508, the receiver 204 may implement a decoding and feedback process for the retransmission. In some embodiments the decoder 214a may process and decode the retransmission (e.g., using a chase combining technique using the data for combining 216a stored in the receiver 204's data storage 216, or using an incremental redundancy technique). In some embodiments, the feedback generator 214c may provide feedback for the retransmission to the transmitter 204 via the IF 212.

The receiver's transmission of Rx Cap information may allow the transmitter 202 to set a retransmission duration or other retransmission parameters that accommodates the Rx Cap information, and the transmitter 202 may thus be expect feedback regarding the receiver 204's retransmission at an appropriate time, which can decrease the chance that the transmitter 202 will erroneously determine that the receiver 204 is not sending an ACK when in fact the receiver 204 is simply not yet done processing the retransmission.

Figure 6:
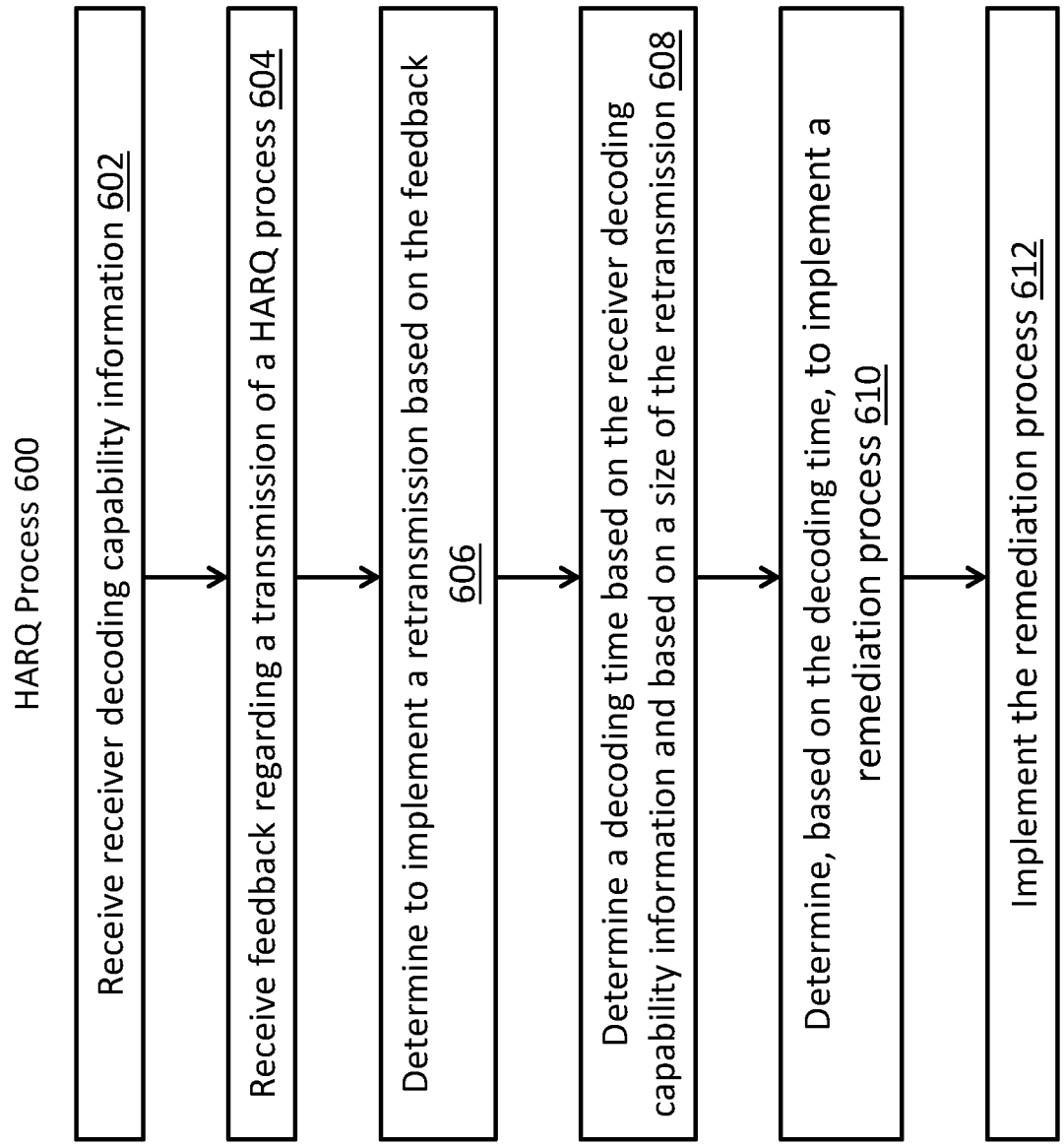
FIG. 6 shows a flowchart of a transmitter HARQ process that includes a remediation process, according to some embodiments.

Referring now to FIG. 6, FIG. 6 shows a flow of a HARQ process 600. The HARQ process 600 includes receiving receiver decoding capability information (602), receiving feedback regarding a transmission of the HARQ process 600 (604), determining to implement a retransmission based on the feedback (606), determining a decoding time based on the receiver decoding capability information and based on a size of the retransmission (608), determining, based on the decoding time, to implement a remediation process (610), and implementing the remediation process (612).

In some embodiments, in operation 602, the transmitter 202 may receive Rx Cap of the receiver 204. The Rx Cap information may indicate a decoding throughput of the receiver 204.

In some embodiments, in operation 604, the transmitter 202 may receive NACK feedback regarding a transmission of the HARQ process 600 (e.g., an initial transmission or a retransmission of the HARQ process 600) indicating that one or more data units of the transmission of the HARQ process 600 were not correctly decoded or processed.

In some embodiments, in operation 606, the transmitter 202 may determine to implement a retransmission based on the NACK feedback. The transmitter 202 may make this determination responsive to determining that a timeout period for the overall HARQ process 600 or for the HARQ process 600 has not yet been reached or exceeded.

In some embodiments, in operation 608, the transmitter 202 may determine a decoding time (e.g., a likely decoding time, a target decoding time, or a maximum decoding time) used by the receiver 204 to process the retransmission, based on the receiver decoding capability information and based on a size of the retransmission. In some embodiments, the decoding time may be a minimum or likely time used or needed by the receiver 204 to decode the retransmission (e.g., may have a duration equal to or similar to a size of the retransmission divided by a throughput (as indicated in the Rx Cap information) of the receiver 204, as determined, for example, by the retransmission manager 210).

In some embodiments, in operation 610, the transmitter 202 may determine, based on the decoding time, to implement a remediation process. In some embodiments, the Rx Cap manager 210b of the transmitter 202 may determine that the default or estimated retransmission feedback timeout period is insufficient to encompass an estimated time at which the transmitter 202 should receive feedback (based on the decoding time, and possibly based on time for transmitting the feedback), and in some embodiments the Rx Cap manager 210b may responsively determine to implement a remediation process. In some embodiments, the Rx Cap manager 210b may determine that implementing a maximum possible (given certain constraints or requirements) retransmission length would still result in the default or estimated retransmission feedback timeout period being insufficient to encompass an estimated time at which the receiver 202 should receive feedback, and the Rx Cap manager 210b may then responsively determine to implement the remediation process.

In some embodiments, in operation 612, the transmitter 202 may implement the remediation process. The remediation process may include a delayed feedback scheme or a deferred feedback scheme in any appropriate manner described here.

Thus, the transmitter 202 may configure a retransmission that accommodates the Rx Cap, and the transmitter 202 may thus be configured to expect feedback regarding the retransmission at an appropriate time, which can decrease the chance that the transmitter 202 will erroneously determine that the receiver 204 is not sending an ACK when in fact the receiver 204 is simply not yet done processing the retransmission.

Figure 7:
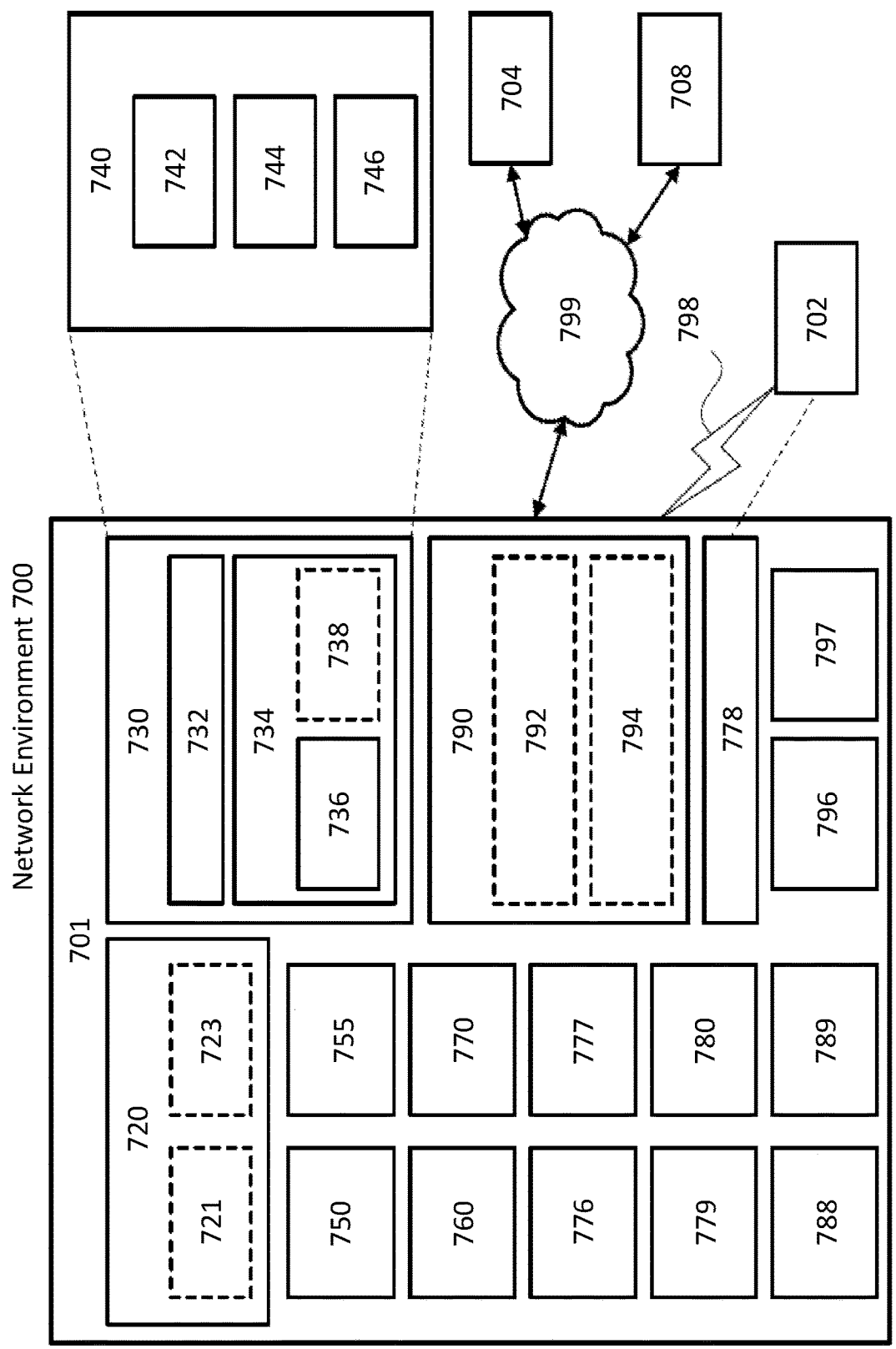
FIG. 7 shows a diagram of an electronic device in a network environment, according to some embodiments.

FIG. 7 shows a diagram of an electronic device 701 in a network environment 700, according to some embodiments. Referring to FIG. 7, the electronic device 701 in the network environment 700 may communicate with an electronic device 702 via a first network 798 (e.g., a short-range wireless communication network, such as a Wi-Fi network), or an electronic device 704 or a server 708 via a second network 799 (e.g., a long-range wireless communication network). The electronic device 701 may communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, and/or an antenna module 797. In one embodiment, at least one of the components (e.g., the display device 760 or the camera module 780) may be omitted from the electronic device 701, or one or more other components may be added to the electronic device 701. In one embodiment, some of the components may be implemented as a single integrated circuit (IC). For example, the sensor module 776 (e.g., a fingerprint sensor, an iris sensor, or an illuminance sensor) may be embedded in the display device 760 (e.g., a display), or the display device 760 may include one or more sensors in addition to the sensor module 776.

In some embodiments, the device 701 may include the transmitter 202, and one of the devices 702, 704, or 708 may be, or a device managing the network 798 or the network 799 may include, the receiver 204. In some embodiments, the device 701 may include the receiver 204, and one of the devices 702, 704, or 708 may be, or a device managing the network 798 or the network 799 may include, the transmitter 202. In some embodiments, the HARQ system 100 includes a first device 701 and a second device 701, the transmitter 202 is included in the first device 701, and the receiver 204 is included in the second device 701.

The processor 720 may execute, for example, software (e.g., a program 740) to control at least one other component (e.g., a hardware or a software component) of the electronic device 701 coupled with the processor 720, and may perform various data processing and/or computations. As at least a part of the data processing and/or computations, the processor 720 may load a command or data received from another component (e.g., the sensor module 776 or the communication module 790) in volatile memory 732, process the command or the data stored in the volatile memory 732, and store resulting data in non-volatile memory 734. The processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, and/or execute a particular function. The auxiliary processor 723 may be implemented as being separate from, or as a part of, the main processor 721.

The auxiliary processor 723 may control at least some of the functions or states related to at least one component (e.g., the display device 760, the sensor module 776, or the communication module 790) from among the components of the electronic device 701, instead of the main processor 721 while the main processor 721 is in an inactive (e.g., sleep) state, or together with the main processor 721 while the main processor 721 is in an active state (e.g., executing an application). According to one embodiment, the auxiliary processor 723 (e.g., an image signal processor or a communication processor) may be implemented as a part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 and/or the non-volatile memory 734.

The program 740 may be stored in the memory 730 as software, and may include, for example, an operating system (OS) 742, middleware 744, or an application 746.

The input device 750 may receive a command or data to be used by another component (e.g., the processor 720) of the electronic device 701, from the outside (e.g., a user) of the electronic device 701. The input device 750 may include, for example, a microphone, a mouse, and/or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. According to one embodiment, the receiver may be implemented as being separate from, or as a part of, the speaker.

The display device 760 may visually provide information to the outside (e.g., a user) of the electronic device 701. The display device 760 may include, for example, a display, a hologram device, and/or a projector and control circuitry to control a corresponding one of the display, the hologram device, and the projector. According to one embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to one embodiment, the audio module 770 may obtain the sound via the input device 750, and/or output the sound via the sound output device 755 or a headphone of an external electronic device 702 directly (e.g., wired) or wirelessly coupled with the electronic device 701.

The sensor module 776 may detect an operational state (e.g., power or temperature) of the electronic device 701 and/or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor.

The interface 777 may support one or more specified protocols to be used for the electronic device 701 to be coupled with the external electronic device 702 directly (e.g., wired) or wirelessly. According to one embodiment, the interface 777 may include, for example, a high definition multimedia interface (HDMI), a universal serial bus (USB) interface, a secure digital (SD) card interface, and/or an audio interface.

A connecting terminal 778 may include a connector via which the electronic device 701 may be physically connected with the external electronic device 702. According to one embodiment, the connecting terminal 778 may include, for example, an HDMI connector, a USB connector, an SD card connector, and/or an audio connector (e.g., a headphone connector).

The haptic module 779 may convert an electrical signal into a mechanical stimulus (e.g., a vibration or a movement) and/or an electrical stimulus which may be recognized by a user via tactile sensation or kinesthetic sensation. According to one embodiment, the haptic module 779 may include, for example, a motor, a piezoelectric element, and/or an electrical stimulator.

The camera module 780 may capture a still image or moving images. According to one embodiment, the camera module 780 may include one or more lenses, image sensors, image signal processors, and/or flashes.

The power management module 788 may manage power supplied to the electronic device 701. The power management module 788 may be implemented as at least a part of, for example, a power management integrated circuit (PMIC).

The battery 789 may supply power to at least one component of the electronic device 701. According to one embodiment, the battery 789 may include, for example, a primary cell which is not rechargeable, a secondary cell which is rechargeable, and/or a fuel cell.

The communication module 790 may support establishing a direct (e.g., wired) communication channel or a wireless communication channel between the electronic device 701 and the external electronic device (e.g., the electronic device 702, the electronic device 704, and/or the server 708) and performing communication via the established communication channel. The communication module 790 may include one or more communication processors that are operable independently from the processor 720 (e.g., the AP) and may support a direct (e.g., wired) communication and/or a wireless communication. According to one embodiment, the communication module 790 may include a wireless communication module 792 (e.g., a cellular communication module, a short-range wireless communication module, and/or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth®, wireless-fidelity (Wi-Fi) direct, and/or a standard of the Infrared Data Association (IrDA)) or the second network 799 (e.g., a long-range communication network, such as a cellular network, the Internet, and/or a computer network (e.g., LAN or wide area network (WAN)). Bluetooth® is a registered trademark of Bluetooth SIG, Inc., Kirkland, WA. These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit and/or receive a signal and/or power to and/or from the outside (e.g., the external electronic device) of the electronic device 701. According to one embodiment, the antenna module 797 may include one or more antennas, and, therefrom, at least one antenna appropriate for a communication scheme used in the communication network, such as the first network 798 and/or the second network 799, may be selected, for example, by the communication module 790 (e.g., the wireless communication module 792). The signal and/or the power may then be transmitted and/or received between the communication module 790 and the external electronic device via the selected at least one antenna.

At least some of the above-described components may be mutually coupled and communicate signals (e.g., commands and/or data) therebetween via an inter-peripheral communication scheme (e.g., a bus, a general purpose input and output (GPIO), a serial peripheral interface (SPI), and/or a mobile industry processor interface (MIPI)).

According to one embodiment, commands and/or data may be transmitted and/or received between the electronic device 701 and the external electronic device 704 via the server 708 coupled with the second network 799. Each of the electronic devices 702 and 704 may be a device of a same type as, or a different type from, the electronic device 701. All or some of operations to be executed at or by the electronic device 701 may be executed at one or more of the external electronic devices 702, 704, or 708. For example, if the electronic device 701 should perform a function and/or a service automatically, or in response to a request from a user or another device, the electronic device 701, instead of, or in addition to, executing the function and/or the service, may request the one or more external electronic devices to perform at least a part of the function and/or the service. The one or more external electronic devices receiving the request may perform the at least a part of the function and/or the service requested, and/or an additional function and/or an additional service related to the request, and transfer an outcome of the performing to the electronic device 701. The electronic device 701 may provide the outcome, with or without further processing of the outcome, as at least a part of a reply to the request. To that end, a cloud computing, distributed computing, and/or client-server computing technology may be used, for example.

One embodiment may be implemented as software (e.g., the program 740) including one or more instructions that are stored in a storage medium (e.g., internal memory 736 or external memory 738) that is readable by a machine (e.g., the electronic device 701). For example, a processor of the electronic device 701 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a compiler or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Herein, embodiments of the present disclosure are described in detail with reference to the accompanying drawings. It should be noted that same or similar elements may be designated by the same reference numerals/letters even though they are shown in different drawings. In the description herein, specific details such as detailed configurations and components are provided to assist with the overall understanding of the embodiments of the present disclosure. Various changes and modifications of the embodiments described herein may be made without departing from the scope of the present disclosure. Certain detailed descriptions may be omitted for clarity and conciseness.

The present disclosure provides for various modifications and various embodiments. It should be understood that the present disclosure is not limited to the various embodiments explicitly described or detailed herein, and that the present disclosure includes modifications, equivalents, and alternatives within the scope of the present disclosure.

Although terms including an ordinal number such as first, second, etc., may be used for describing various elements, the elements are not restricted by such terms. Such terms are used to distinguish one element from another element, and do not imply any specific ordering. As used herein, the term "and/or" includes any and all combinations of one or more associated items. Singular forms are intended to include plural forms unless the context clearly indicates otherwise. In the present disclosure, it should be understood that the terms "include" or "have" indicate the existence of a feature, a number, a step, an operation, a structural element, a part, or a combination thereof, and do not exclude the existence or probability of the addition of one or more other features, numbers, steps, operations, structural elements, parts, or combinations thereof.

According to one embodiment, at least one component (e.g., a manager, a set of processor-executable instructions, a program, or a module) of the above-described components may include a single entity or multiple entities. One or more of the above-described components may be omitted, or one or more other components may be added. Alternatively or additionally, a plurality of components (e.g., a manager, a set of processor-executable instructions, a program, or a module) may be integrated into a single component. In this case, the integrated component may still perform one or more functions of each of the plurality of components in the same or similar manner as they are performed by a corresponding one of the plurality of components before the integration. Operations performed by the manager, the set of processor-executable instructions, the program, the module, or another component may be carried out sequentially, in parallel, repeatedly, or heuristically, or one or more of the operations may be executed in a different order or omitted, or one or more other operations may be added.

What is claimed is:

1. A transmitter comprising:
   a processor; and
   a memory, wherein the memory stores instructions that, when executed by the processor, cause the processor to:
   transmit to a receiver, an initial transmission of a hybrid automatic repeat request (HARQ) process;
   receive from the receiver, receiver decoding capability information and feedback indicative of decoding success by the receiver, wherein the receiver decoding capability information includes decoding throughput of the receiver;
   set a retransmission duration based on the decoding throughput of the receiver; and
   implement a retransmission of the HARQ process based on the retransmission duration.

2. The transmitter of claim 1, wherein:
   the retransmission of the HARQ process is a first retransmission of the HARQ process, and
   the instructions that cause the processor to implement the first retransmission of the HARQ process based on the retransmission duration comprise instructions that cause the processor to:
   determine that no acknowledgment (ACK) has been received by an end of the retransmission duration; and
   implement, responsive to the instructions that cause the processor to determine no ACK has been received by an end of the retransmission duration, a second retransmission of the HARQ process or a timeout process.

3. The transmitter of claim 1, wherein the instructions that cause the processor to set the retransmission duration based on the receiver decoding capability information include instructions that cause the processor to set a modulation order of the retransmission of the HARQ process based on the receiver decoding capability information.

4. The transmitter of claim 1, wherein the instructions that cause the processor to set the retransmission duration based on the receiver decoding capability information include instructions that cause the processor to set a number of data subcarriers for the retransmission based on the receiver decoding capability information.

5. The transmitter of claim 4, wherein the instructions that cause the processor to set the number of data subcarriers for the retransmission include instructions that cause the processor to aggregate multiple users in at least one multi-user physical-layer convergence-procedure protocol data unit (MU-PPDU) and allocate an appropriate resource unit (RU) size for each of the multiple users.

6. The transmitter of claim 4, wherein the instructions that cause the processor to set the number of data subcarriers for the retransmission include instructions that cause the processor to allocate an appropriate bandwidth (BW) for the retransmission.

7. The transmitter of claim 1, wherein the instructions that cause the processor to set the retransmission duration based on the receiver decoding capability information include instructions that cause the processor to set a number of bits of the retransmission of the HARQ process based on the receiver decoding capability information.

8. The transmitter of claim 7, wherein the instructions that cause the processor to set the number of bits of the retransmission of the HARQ process include instructions that cause the processor to set a number of parity bits or information bits included in the retransmission.

9. The transmitter of claim 7, wherein the instructions that cause the processor to set the number of bits of the retransmission of the HARQ process include instructions that cause the processor to include padding in the retransmission.

10. The transmitter of claim 1, wherein the instructions that cause the processor to set the retransmission duration include instructions that cause the processor to use at least one parameter value that deviates from at least one default parameter value for the retransmission of the HARQ process such that the retransmission duration increases.

11. A receiver comprising:
    a processor; and
    a memory, wherein the memory stores instructions that, when executed by the processor, cause the processor to:
    receive from a transmitter, an initial transmission of a hybrid automatic repeat request (HARQ) process;
    transmit to the transmitter, receiver decoding capability information and feedback indicative of decoding success by the receiver, wherein the receiver decoding capability information includes decoding throughput of the receiver;
    receive from the transmitter, a retransmission during a retransmission duration set by the transmitter, wherein setting of the retransmission duration includes setting a retransmission duration based on the decoding throughput of the receiver; and
    implement a decoding and feedback process for the retransmission.

12. The receiver of claim 11, wherein the instructions further cause the processor to transmit the receiver decoding capability information as at least a part of a control frame.

13. The receiver of claim 11, wherein the instructions further cause the processor to transmit the receiver decoding capability information as at least a part of a feedback frame.

14. The receiver of claim 11, wherein the instructions further cause the processor to transmit the receiver decoding capability information as at least a part of a connection establishing process.

15. A system comprising:
    a receiver; and
    a transmitter,
    wherein the receiver is configured to transmit data comprising a decoding throughput of the receiver and feedback indicative of decoding success of an initial transmission by the receiver to the transmitter, and
    the transmitter is configured to set a retransmission duration based on the decoding throughput of the receiver and implement a retransmission based on the retransmission duration.

16. The system of claim 15, wherein the transmitter is further configured to set a retransmission feedback timeout duration based on the decoding throughput.

17. The system of claim 16, wherein the retransmission feedback timeout duration is at least equal to a sum of (i) the retransmission duration and (ii) an additional time, and the additional time is set by the transmitter based on the decoding throughput.

18. The system of claim 15, wherein the transmitter is further configured to:
 estimate a time at which retransmission feedback should be received; and
 determine that an estimated retransmission feedback timeout period does not encompass the time at which the retransmission feedback should be received.

19. The system of claim 15, wherein transmitter is configured to request the feedback according to a deferred feedback scheme.

\* \* \* \* \*